(12) United States Patent
Shang et al.

(10) Patent No.: US 11,797,397 B2
(45) Date of Patent: *Oct. 24, 2023

(54) HYBRID NVRAM LOGGING IN FILESYSTEM NAMESPACE

(71) Applicant: EMC IP Holding Company LLC, Hopkinton, MA (US)

(72) Inventors: Pengju Shang, Milpitas, CA (US); George Mathew, Belmont, CA (US); Dhawal Bhagwat, Bangalore (IN); Pranay Singh, Cupertino, CA (US); Englin Koay, Dublin, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 28 days.

This patent is subject to a terminal disclaimer.

(21) Appl. No.: 17/513,352

(22) Filed: Oct. 28, 2021

(65) Prior Publication Data

US 2022/0050755 A1 Feb. 17, 2022

Related U.S. Application Data

(63) Continuation of application No. 16/787,987, filed on Feb. 11, 2020, now Pat. No. 11,226,877, which is a (Continued)

(51) Int. Cl.
*G06F 3/06* (2006.01)
*G06F 11/14* (2006.01)
*G06F 16/18* (2019.01)

(52) U.S. Cl.
CPC .......... *G06F 11/1471* (2013.01); *G06F 3/065* (2013.01); *G06F 3/0619* (2013.01); *G06F 3/0679* (2013.01); *G06F 11/1456* (2013.01); *G06F 16/1805* (2019.01); *G06F 16/1815* (2019.01); *G06F 2201/84* (2013.01)

(58) Field of Classification Search
CPC ............ G06F 11/1471; G06F 11/1456; G06F 16/1815; G06F 16/1805; G06F 3/0619; G06F 3/065; G06F 3/0679; G06F 2201/84
See application file for complete search history.

(56) References Cited

U.S. PATENT DOCUMENTS 5,832,515 A 11/1998 Ledain et al.
6,021,408 A 2/2000 Ledain et al.
(Continued)

FOREIGN PATENT DOCUMENTS

WO 2016/122710 A1 8/2016
WO WO-2016122710 A1 * 8/2016 .............. G06F 11/00

*Primary Examiner* — Nanci N Wong
(74) *Attorney, Agent, or Firm* — Workman Nydegger (57) ABSTRACT

In one example, a method for writing data includes receiving a write request and performing a first type of logging process in connection with the write request, and creating a corresponding first logging record. Additionally, a second type of logging process is performed in connection with the write request, and a corresponding second logging record created, where the second type of logging process is different from the first type of logging process. Next, a determination is made, as between the two logging records, which of the logging records requires the least amount of non-volatile random access memory (NVRAM), and the logging record that requires the least amount of NVRAM is written to the NVRAM.

14 Claims, 3 Drawing Sheets

Related U.S. Application Data continuation of application No. 14/871,051, filed on Sep. 30, 2015, now Pat. No. 10,613,941.

(56) References Cited

U.S. PATENT DOCUMENTS

| | | |
|---|---|---|
| 7,155,514 B1 | 12/2006 | Milford |
| 7,249,150 B1 | 7/2007 | Watanabe et al. |
| 7,890,469 B1 | 2/2011 | Maionchi et al. |
| 8,799,557 B1 | 8/2014 | Chen |
| RE45,316 E | 12/2014 | Gibbon et al. |
| 9,122,588 B1 | 9/2015 | Mondal et al. |
| 10,169,169 B1 | 1/2019 | Shaikh et al. |
| 2004/0030703 A1 | 2/2004 | Bourbonnais et al. |
| 2004/0210577 A1 | 10/2004 | Kundu et al. |
| 2006/0155774 A1 | 7/2006 | Sachedina et al. |
| 2007/0233753 A1 | 10/2007 | Taniguchi et al. |
| 2009/0070356 A1 | 3/2009 | Mimatsu |
| 2009/0089560 A1 | 4/2009 | Liu et al. |
| 2012/0109895 A1 | 5/2012 | Zwilling et al. |
| 2013/0088373 A1 | 4/2013 | Takano |
| 2014/0149361 A1 | 5/2014 | Hosey |
| 2014/0156618 A1 | 6/2014 | Castellano |
| 2014/0281121 A1 | 9/2014 | Karamcheti et al. |
| 2015/0058291 A1 | 2/2015 | Earl et al. |
| 2015/0058577 A1 | 2/2015 | Earl |
| 2015/0331806 A1 | 11/2015 | Mondal et al. |
| 2016/0321294 A1 | 11/2016 | Wang et al. |
| 2016/0378653 A1 | 12/2016 | Lu et al. |
| 2016/0378815 A1 | 12/2016 | Lu et al. |
| 2017/0083411 A1 | 3/2017 | Berinde et al. |

\* cited by examiner

HYBRID NVRAM LOGGING IN FILESYSTEM NAMESPACE

FIELD OF THE INVENTION

Embodiments of the present invention generally concern data backup and restoration. More particularly, at least some embodiments of the invention relate to systems, hardware, computer-readable media, and methods directed to NVRAM logging processes in a computing environment.

BACKGROUND

Entities often generate and use data that is important in some way to their operations. This data can include, for example, business data, financial data, and personnel data. If this data were lost or compromised, the entity may realize significant adverse financial and other consequences. Accordingly, many entities have chosen to back up some or all of their data so that in the event of a natural disaster, unauthorized access, or other events, the entity can recover any data that was compromised or lost, and then restore that data to one or more locations, machines, and/or environments.

While data backup is a valuable and important function, the ever increasing volume of data that is generated presents significant problems. In particular, many companies today find their backup and recovery processes strained as data growth in enterprise IT environment continues to accelerate at exponential rates, while data-protection solutions have struggled to keep pace.

At least some of the problems encountered in backup and restore systems, processes and environments concern the use of namespaces and associated memory. For example, a customer may create and use multiple namespaces in a single restore environment, domain or system, and non-volatile random-access memory (NVRAM) may be allocated to each of the namespaces. The NVRAM may be allocated for various reasons. By way of illustration, allocation of NVRAM to namespaces can improve performance in some instances, since the NVRAM may enable acceleration of namespace operations by allowing the filesystem to write the data into NVRAM and return, rather than writing to disk, then return. At a later time, the data written into NVRAM will be flushed onto disk for permanent storage purpose. The use of NVRAM in this way may also provide a measure of data protection in certain scenarios. For example, data written in NVRAM is relatively safe and can survive system crashes or power outage. In cases of a system crash, the NVRAM is used as a journaling device to recover the logged operations during system restart.

While the use of NVRAM can be advantageous in certain circumstances, it also introduces some problems. For example, because NVRAM is significantly more expensive than disk storage, the NVRAM resource in various environments is limited and each namespace can only be allocated a relatively small, fixed sized NVRAM. Thus, when the NVRAM is filled up, the logged data have to be flushed down to disk so that the NVRAM can be reused. Therefore, it is important to utilize the limited NVRAM space efficiently so as not to compromise system operations.

At least one approach to the utilization of NVRAM involves using pure physical NVRAM logging (PL) in namespace, that is, where the NVRAM will record the physical data of each transaction that is being updated, namely, the (key, value) pairs. One problem with this approach however is that it does not use the NVRAM space efficiently. For example, in some transactions, the same (key, value) pairs could be updated multiple times and, as a result, the PL design may record some redundant logs in the NVRAM. However, only the latest version needs to be logged because the previous versions will be overwritten by the most recent one.

Another approach to the utilization of NVRAM involves the use of a logical logging mechanism (LL). However, one significant disadvantage of LL is the extra burden it imposes to interpret/understand the operations (logical data) during recovery. As well, LL cannot always be directly applied into a file system because some types of transactions may involve the update of as few as a single pair of (key, data) values. In such circumstances, LL does not provide any improvement of logging efficiency. In fact, in these circumstances, the NVRAM footprint of LL can be even larger than that of a comparable PL approach.

In light of problems and shortcomings such as those noted above, it would be useful to be able to provide more efficient use of limited NVRAM resources in a computing environment. As well, it would be useful to have the flexibility to employ multiple different logging mechanisms in connection with the NVRAM resources. Correspondingly, it would be useful to be able to employ a hybrid logging approach that makes effective use of the advantageous aspects of various different logging processes for NVRAM resources, while avoiding or at least attenuating the impact of less advantageous aspects of those logging processes.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

At least some embodiments of the invention relate to systems, hardware, computer-readable media, and methods directed to NVRAM logging processes in a computing environment, such as a backup and restore environment. It should be noted however that, more generally, the disclosed hybrid logging processes can be used in any circumstance where write transactions are performed, and the scope of the invention is not limited to any particular operating environment, nor to any particular application or use of hybrid logging. The hybrid logging process can be performed in connection with a filesystem namespace, for example, or any other suitable environment.

The logging processes are hybrids in that they involve the use of multiple different logging processes with respect to a particular NVRAM resource and namespace. The implementation and use of the hybrid logging process can be based on a variety of considerations, including, but not limited to, the nature and types of operations involving the NVRAM, and the NVRAM capacity.

It should be understood that the term 'backup,' as used herein, is intended to be broadly construed and is not limited to any particular type or form of backup. Thus, backup, as contemplated by this disclosure, embraces, but is not limited to, full backups, snapshots, replication, incremental backups, de-duplicated backups, and any other circumstance or process where data that is desired to be protected is copied to one or more backup resources for protection.

In at least some implementations, a hybrid NVRAM logging process, which may be referred to generally herein as 'HL,' includes both physical logging (PL) and logical logging (LL). The PL approach has a variety of merits. For example, it is straightforward in that the system is simply logging whatever the data is being written or updated by the transaction. Second, in cases of crash and restart, the NVRAM replay is relatively fast because the records in NVRAM are pure (key, value) pairs which can be directly applied to namespace by calling default namespace I/O interfaces, without imposing the extra burden of translating them or understanding them. The LL approach likewise has merits. For example, the LL approach may reduce the logging size by only recording the operations (logical data) of the transaction itself, rather than the actual physical data being updated or added.

In general then, logical logging can be used when it results in a reduction in the NVRAM logging footprint, and physical logging can be used for transactions that are relatively small and thus implicate a limited recovery workload. Thus, in one particular example of a process, such as a backup process, a logical logging process is used for a file creation process, while a physical logging process is used for a transaction that involves only a single operation, or a small number of operations.

Advantageously then, embodiments of the invention implement a hybrid logging approach that takes advantage of the respective benefits of the PL and LL approaches, while tending to avoid, or at least reduce, the consequences of the respective disadvantages of those two approaches. The result can be relatively more efficient use of NVRAM resources, which may be limited, and faster and more efficient recovery processes in the event that backed up data is required to be restored for some reason.

A. Example Operating Environments

In general, embodiments of the invention may include and/or be implemented in an operating environment that includes one or more clients that include data that is desired to be protected in some way. The clients can communicate with a backup server and may include one or more applications which generate, and/or cause the generation of, data which is desired to be backed up for later restoration to the client and/or one or more other target machines. The clients and the target machines can be physical machines or virtual machines (VM), though neither type of machine is required for any embodiment. As used herein, the term 'data' is intended to be broad in scope and embraces, by way of example and not limitation, data chunks, data blocks, atomic data, emails, objects of any type, files, contacts, directories, volumes, and any group of one or more of the foregoing.

Figure 1:
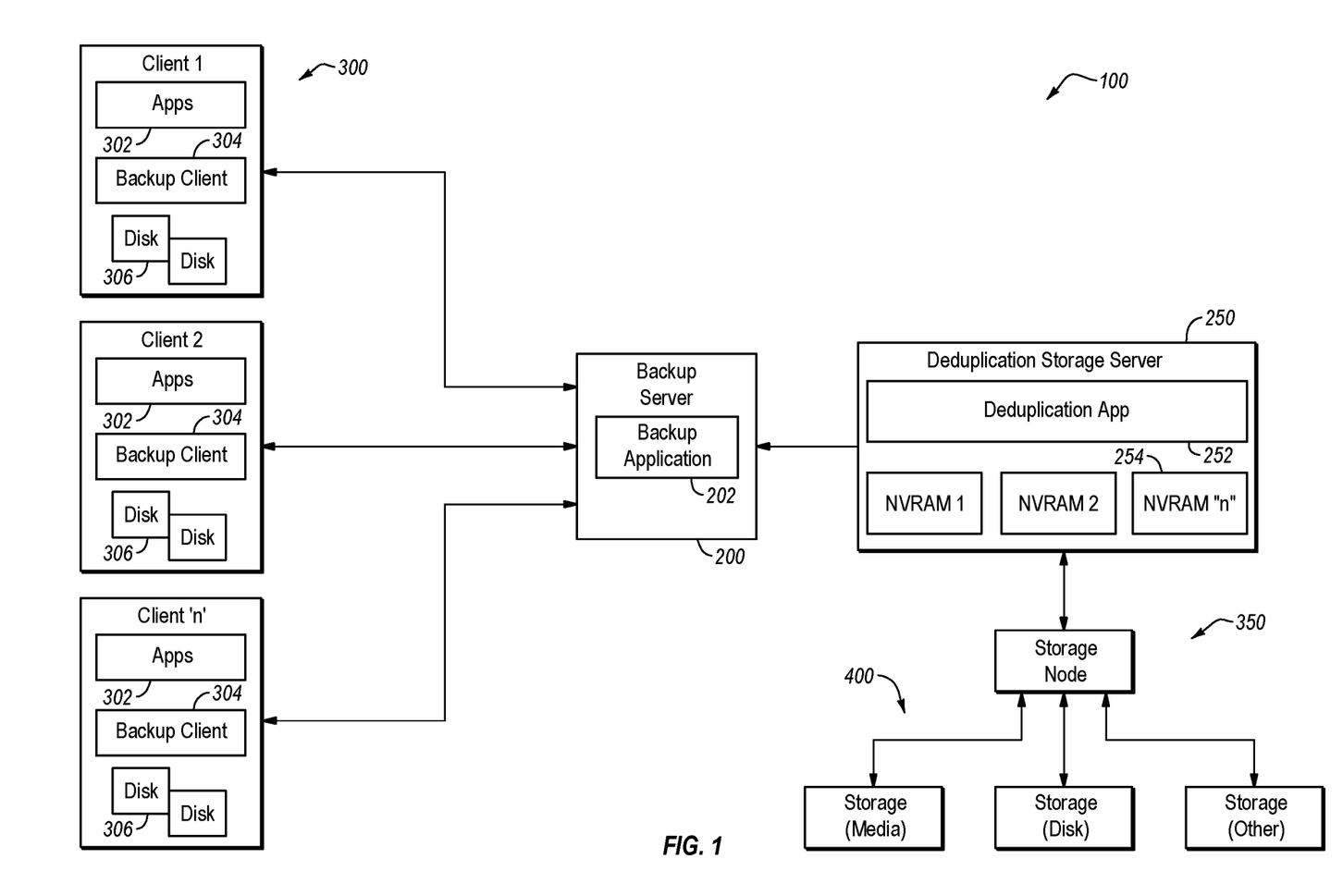
FIG. 1 is directed to aspects of various example operating environments for at least some embodiments.

With the foregoing in mind, attention is directed now to FIG. 1 which discloses one example of an operating environment that may be suitable for one or more embodiments of the invention. In FIG. 1, the example operating environment is denoted at 100 and may be a network such as a local area network, a wide area network, or any other networked configuration. Moreover, the operating environment 100, or any group of one or more of its elements, may comprise, form an element of, or constitute, a cloud computing environment. The operating environment 100 may include various devices including servers and other computing devices that can be interconnected by any suitable mechanism including hardwire connections, wireless connections, optical connections, and any combination of these. Thus, the operating environment 100 may employ a variety of communication media, such as hardwire, wireless, optical media, or some combination thereof. In some instances, some or all of the operating environment 100 may comprise an optical communication network.

As indicated in FIG. 1, the example operating environment 100 includes a backup server 200 configured for communication with a deduplication storage server 250, one or more clients 300, and a storage node 350 that may comprise an element of a cloud computing environment. In some embodiments, the deduplication storage server 250 can be an EMC Corp. DataDomain deduplication storage system, though that is not required.

The backup server 200 and deduplication storage server 250 may reside at different physical locations than the clients 300. As well, the backup server 200 and the deduplication storage server 250 may reside at the same location, or different respective locations. In some embodiments, the respective functionalities of the backup server 200 and deduplication storage server 250 may be combined together in a single server. In yet other environments, the deduplication storage server 250 can be an element of the storage node 350, or combined with the storage node 350 to form an entity. More generally, the functionalities disclosed in connection with the example operating environment 100 can be allocated amongst entities in any suitable manner and, accordingly, the functional allocations disclosed herein are presented only by way of example and are not intended to limit the scope of the invention in any way.

The storage node 350, which may be a cloud storage node, can communicate with, or include, various types of storage 400. At least some of the storage 400 can be located at a disaster recovery site that may be in a location remote from the backup server 200 and/or the clients 300. In another implementation, some of the storage 400 can be located at a retention storage site that may be in a location remote from the backup server 200 and/or the clients 300.

In general, backups of one or more of the clients 300 can be made by cooperation between the backup server 200 and the client 300, and the backups can then be deduplicated and stored by the deduplication storage server 250 at the storage node 350. Subsequently, one or more of the stored backups can be restored by the deduplication storage server 250 and/or the backup server 200 to one or more of the clients 300 and/or any other target(s).

The backup server 200, deduplication storage server 250, clients 300, storage node 350 and/or target(s) may be physical machines, virtual machines (VM), containerized machines, or any other suitable type of device. As well, some or all of the storage 400 can be implemented as physical or virtual devices. Finally, while not specifically illustrated, the storage node 350 can include one or more database servers that communicate with one or more data stores. The database servers can store metadata, such as pointers for example, that point to data stored in the data store(s).

In one alternative to the arrangement of FIG. 1, the storage node 350 can be replaced with, or constitute, a primary storage device that communicates with the backup server 200 and/or the deduplication storage server 250. The primary storage device, in turn, may communicate with a data domain, which may incorporate the EMC Corp. DataDomain backup technology, that includes one or more storage devices where backups can be retrievably stored. The storage devices of the data domain can include, for example, an onsite retention storage device or array, and also an offsite disaster recovery (DR) storage device or array.

With particular reference first to the backup server 200, some embodiments may employ a backup server 200 in the form of an EMC Avamar server or NetWorker server, although the scope of the invention is not limited to those example servers. The backup server 200 includes a backup application 202 that participates in the generation of backups. Example implementations of the backup application 202 are discussed in more detail below.

One or more of the nodes, such as client 300, with which the backup server 200 communicates can take the form of a server. It is not required that the server be any particular type of server. One or more of the client(s) 300 include any of various applications 302 that generate data that is desired to be protected. As well, the client(s) 300 can each include a respective instance of a backup client 304 that generally operates in cooperation with the backup application 202 of the backup server 200 to create one or more backups that include data that is resident on storage media 306, such as disks for example, of the client 300. The backups thus created can be communicated to the storage node 350 for storage and subsequent retrieval.

Example embodiments can be employed in a variety of different devices and applications, examples of which the following EMC products related to backup, deduplication, and storage devices, namely, EMC DataDomain, EMC Avamar, and EMC Cloud Boost. However, the scope of the invention is not limited to backup devices and, accordingly, yet other embodiments can be employed in storage devices such as EMC XtremIO, EMC VNX, EMC VMAX, EMC Isilon, EMC Atmos, and EMC Elastic Cloud Storage. Finally, embodiments of the invention can be applied to any storage medium, examples of which include, but are not limited to, memory, flash, hard disk and tape.

B. Example Deduplication Storage Server

With continued reference to the example operating environment 100 of FIG. 1, the deduplication storage server 250 may include a data deduplication application 252 operable to deduplicate savesets and/or other backups created by the backup server 200 or at the direction of the backup server 200. As well, the deduplication storage server 250 may include, or have access to, one or more NVRAM 254 which can be used, for example, in data deduplication and data read/write processes performed by the deduplication storage server 250. Examples of read and write operations include read and write operations performed from and to, respectively, the storage node 350.

Among other things, and as discussed in more detail elsewhere herein, the NVRAM 254 may be used to retrievably store various types of logging records, such as logical logging records and physical logging records. In some example embodiments, a fixed size NVRAM, such as about 1 MB for example, is allocated to each namespace employed by the deduplication storage server 250. However, the size of the NVRAM allocated to a namespace, or other type of space, can be any size that is suitable and the scope of the invention is not limited to the aforementioned example. Likewise, the number of NVRAM instances employed in a particular application or entity is not limited. Correspondingly, FIG. 1 indicates that NVRAM 254 (1 . . . n) can be used.

C. Example Host Configuration

Figure 2:
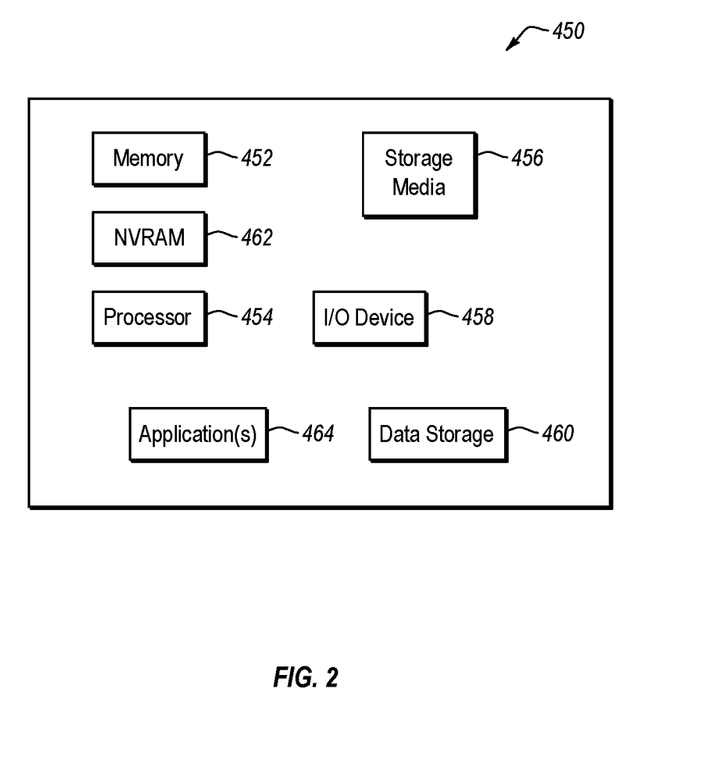
FIG. 2 discloses aspects of an example host configuration.

With reference briefly to FIG. 2, one or more of the backup server 200, deduplication storage server 250, clients 300, or storage node 350 can take the form of a physical computing device, one example of which is denoted at 450. In the example of FIG. 2, the computing device 450 includes a memory 452, one or more hardware processors 454, non-transitory storage media 456, I/O device 458, data storage 460, and NVRAM 462. As well, one or more applications 464 are provided that comprise executable instructions. Such executable instructions can take the form, for example, of one or more of a backup application, a backup client, or a deduplication application.

D. General Aspects of Hybrid Logging Processees

With the preceding discussion in view, details are now provided concerning some general aspects of hybrid logging procedures employed in various embodiments of the invention. As noted elsewhere herein, in at least some embodiments, hybrid logging processes use a combination of logical logging and physical logging in order to efficiently utilize NVRAM resources, which may be limited. Thus, an example hybrid logging process applies logical logging (LL) to a transaction when a logical logging process can reduce the NVRAM logging footprint relative to what the footprint would be if a physical logging process were used instead. As well, this example hybrid logging process applies physical logging (PL) to a relatively small transaction, such as a single operation for example, so as to minimize a recovery workload.

The foregoing thus makes clear that the hybrid logging process and, more particularly, the particular logging processes used as part of a hybrid logging process, can be driven by a variety of considerations or parameters. Such parameters include, but are not limited to, any one or more of the amount of NVRAM available, the way in which available NVRAM is allocated, the amount of NVRAM required by a particular transaction, and the amount of work that would be required to recover a transaction from the NVRAM.

With respect to the example of a logical logging portion of a hybrid logging process, when using logical logging, the NVRAM only records the necessary information (logical data) about the transaction itself, rather than the actual physical data being updated or added. Thus, logical logging can improve the system performance and achieve the same degree of data protection in the NVRAM as PL does because logical logging does not require storage or other manipulation of the actual data implicated by a transaction. In more detail, logical logging can help advance more efficient use of NVRAM in various ways.

One way that logical logging can facilitate more efficient use of NVRAM is by reducing the footprint of long operations in the NVRAM. A comparison with physical logging helps to illustrate this point. In particular, in a physical logging process, creating a file may require logging seven pairs of (key, value) data, including the file name, file attributes, namespace attributes, and hash values. On the other hand, with logical logging, the NVRAM only needs to log the operation type and the file name.

Logical logging can facilitate more efficient use of NVRAM in other ways as well. For example, logical logging can eliminate duplicated logging records. Using the same comparison with physical logging indicated above, the file creation operation in a physical logging operation will update the namespace attributes twice in one transaction. The first update is for allocating the inode number, and the second update is for updating the namespace stats. Thus, both updates are writing into the same (key, value) data. With logical logging however, NVRAM does not need to log these data, and is thus able to reduce the amount of NVRAM space consumed, and the data protection purpose is achieved by logging all the necessary logical data in the NVRAM.

Thus, using the logical data of the operation, a logical logging process helps to ensure that the system can reproduce the same operation during a recovery process. Moreover, the file system is able to minimize any extra recovery burden imposed by logical logging because, during recovery, the most expensive operations are reading and writing data from disk, while interpretation of logical logging records is relatively less expensive, and is performed in memory.

On the other hand, physical logging is used when the transaction is performing a very small transaction or operations, such as updating or writing a single (key, value) pair. For these transactions, the physical logging process only needs to record the (key, value) pair itself. Accordingly, the burden imposed on the NVRAM in this case may be the same size, or smaller than, the burden that would be imposed if a logical logging process for that transaction were used instead.

In a hybrid logging recovery process, the file system includes intelligence that enables it to determine what type of the NVRAM log record is, and then implement the correct replay method to either directly apply the data, if the log record concerns a physical logging process, or translate the logical data into physical data and then apply, if the log record concerns a logical logging process. Thus, the implementation of a hybrid logging process can help to minimize the size of namespace NVRAM logging records, one result of which is that the same size of NVRAM can hold relatively more log records. Correspondingly, the namespace will flush less frequently, and overall performance will be improved.

E. Hybrid Logging Example Results

With the foregoing discussion in view, and directing attention now to the examples set forth in Table 1 and Table 2, below, details are provided concerning some example results obtained in connection with hybrid logging processes.

In general, the logging method employed is tailored to the specific transaction that will be involved. That is, for each transaction with which logical logging will be employed, the logging method will be specific to that transaction because different transactions require different "necessary logical data." In the example of Table 1, an operation to create a file is used to illustrate some aspects of an example logging method, such as a logical logging method.

In general, Table 1 is directed to a comparison of the use of a physical logging process for creating an example file, and a logical logging process for creating the same example file.

TABLE 1

| Steps to create a file | Physical data logged (PL) and size | Logical data logged (LL) |
| --- | --- | --- |
| Apply for an inode, update the namespace inode stats | key and data (namespace attribute) = (32 + 88) bytes | LL needs the inode number, because this file has to use this particular inode, 28 bytes |
| Store the inode | Key and data (including all inode information, directory information, and protocol information) = (32 + 96 + 28) bytes | LL needs some information about the inode: mtime, user id, group id, etc. (8 + 4 + 4 + 4 + 8 + 4) bytes |
| Update the namespace inode stats after the store is finished | key and data (namespace attribute) = (32 + 88) bytes | LL does not need them because they can be calculated. |
| Store the case sensitive hash value of the file name | key 32 bytes | LL does not need them because they can be calculated. |
| Store the directory entry | Key, directory entry, and file name (32 + 20) bytes + filename_size | LL only needs file name filename_size |
| Update the inode information | Key, data (e.g., number of links to this inode, updating the inode hash) = (32 + 96) bytes | LL does not need them because they can be calculated. |
| Update the directory stats | Key, data (e.g., entry count of the directory, directory size, directory entry hash) = (32 + 96) bytes | LL does not need them because they can be calculated. |

As is evident from the disclosure of Table 1, the use of logical logging for a file creation transaction significantly reduces, relative to the use of physical logging for a file creation transaction, the size of data to be logged. In this particular example, the total size of physical logging for the file creation transaction is 768 bytes plus the size of the file name. By comparison, the use of logical logging for the file creation transaction requires only 60 bytes plus the size of file name. Moreover, while logical logging requires extra information to indicate the operation type, the total size of logical logging for the operation is still less than 80 bytes plus the size of file name. On the other hand, for small transactions, such as those that work on a single data entry or a small number of data entries, physical logging will be used and only the new data entry is logged. Thus, the type of logging employed, as well as the transaction(s) in connection with which that logging is employed, may be a function of the nature of the transaction to be logged, and the NVRAM space implicated by that transaction.

It should be noted that different types of logging processes are used as part of a hybrid logging process, a recovery process involving logging records stored in NVRAM must be able to differentiate between/among the different types of NVRAM logging records so that the content of those records can be properly understood and employed. To this end, at least some embodiments employ a single bit at the beginning of the transaction to indicate the type of logging records. Of course, any other method or mechanism that specifies the type of a particular logging record can alternatively be employed.

With Table 1 and the corresponding discussion in view, Table 2 is directed to a comparison of the use of a physical logging process for creating a file, and a hybrid logging process for creating a file. As indicated in the disclosure of Table 2, the hybrid logging process can provide significant improvements, relative to a purely physical logging process, in terms of NVRAM space utilized.

TABLE 2

| Operation | Hybrid logging size (bytes) | Physical logging size (bytes) | Amt. (X) reduced |
|---|---|---|---|
| remove | 66 | 424 | 6.424242 |
| mkdir | 97 | 709 | 7.309278 |
| mknode -- new file | 95 | 790 | 8.315789 |
| mknode -- copy file | 100 | 1076 | 10.76 |
| Rename | 105 | 788 | 7.504762 |
| Update (updating the attribute only) | 96 | 268 | 2.791667 |
| Update (updating the content handle) | 216 | 268 | 1.24 |
| The other ops (using PL) | x | x | 1 |

As indicated by the disclosure of Table 2, the NVRAM space utilization can, in some implementations, be improved by about 3 times on average with a hybrid logging process, relative to what the NVRAM space utilization would be if a purely physical logging process were employed. This can be further demonstrated with a micro benchmark to compare the respective footprint, for a given transaction, of a hybrid logging process, and a physical logging process. In general, the micro benchmark process is intended to mimic a grouping of files, with respect to which various example processes are performed. The micro benchmark is not necessarily intended to exactly reflect actual operating conditions, but is only intended to provide a reasonable approximation of some possible operating conditions.

In the example micro benchmark process, details of which are set forth in Table 3 below, 10 directories are created, each directory including 100 files. Data is written into each of the files, a copy is made of each file, the files are each renamed, and then the files are removed.

TABLE 3

| | | |
|---|---|---|
| Hybrid logging size (LL ops) | 1572679 | |
| Hybrid logging size (PL ops) | 389779 | |
| Current Pure Physical Logging size | 5280821 | |
| Total HL size | 1962458 | 2.7X improvement |
| Total physical logging size | 5280821 | |

As can be seen from the example benchmark of Table 3, the use of a hybrid logging process for the example file set and file operations provides about a 2.7x reduction in the amount of NVRAM space required, relative to the NVRAM space that would be required if a purely physical logging process were performed for the same file set and file operations.

F. Example Hybrid Logging Methods

Figure 3:
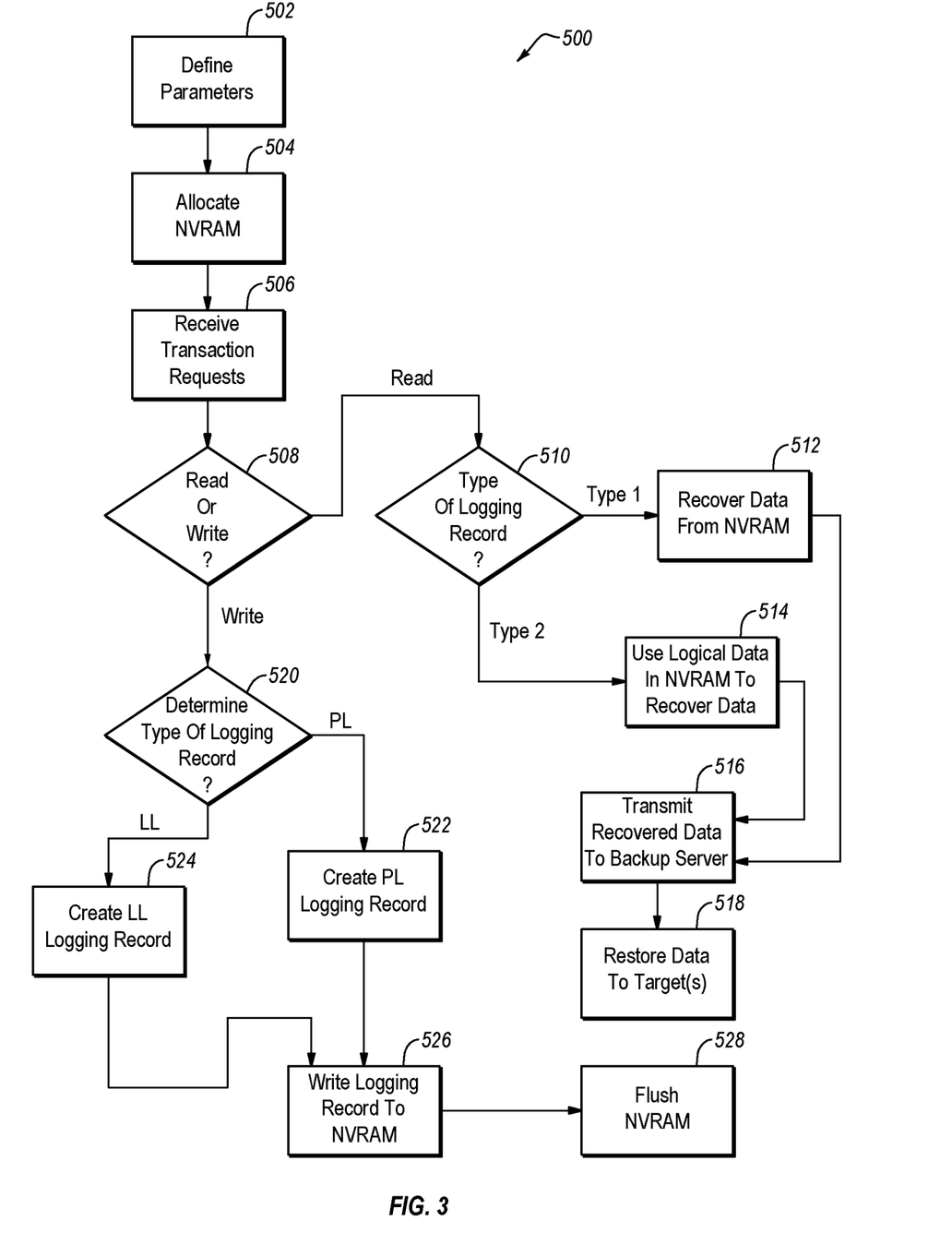
FIG. 3 is directed to a flow diagram disclosing aspects of various example hybrid logging processes.

With reference now to FIG. 3, details are provided concerning hybrid logging methods, one example of which is denoted generally at 500. The method 500 can be performed by a single entity, or a group of entities. In at least some embodiments of the invention, the method 500 is performed by a deduplication storage server, although that is not necessarily required.

The method 500 can begin at 502 where parameters are defined that will guide the performance of hybrid logging of transactions. Such parameters can include, but are not limited to, the amount of NVRAM available, the number of transactions that will be logged, determining an amount of NVRAM space allocated to the set of transactions that are to be performed, determining a threshold NVRAM space requirement corresponding to a physical logging process, and determining a threshold NVRAM space requirement corresponding to a logical logging process. As to these latter two parameters, the threshold NVRAM space requirement refers to a threshold at which one type of logging process will be used in preference over another type of logging process. Thus, for a given transaction, the logging process employed can be the logging process that results in the relatively smaller amount of NVRAM employed. As such, a comparison can be performed between the NVRAM that would be consumed if a transaction were logged with a physical logging process, and the NVRAM that would be consumed if that transaction were logged with a logical logging process.

Before, or after, one or more of the parameters are defined at 502, the available NVRAM can be allocated 504. In some embodiments, the NVRAM is allocated on a namespace basis. However, the scope of the invention is not so limited and, more generally, NVRAM can be allocated on any other suitable basis.

Next, one or more transaction requests are received 506. Such transaction requests may concern, for example, a write transaction such as a file creation or modification transaction, a read transaction, or a delete transaction. One, some, or all of the transactions may concern backed up data. A write transaction, for example, may be performed in connection with a data backup process, such that the write transaction, when performed, results in the backup of data. The write transaction request may include or imply data deduplication, such that, for example, data identified in the write transaction request is deduplicated prior to being backed up. In other embodiments, the data identified in the write request may have been deduplicated prior to generation of the write request. A read transaction may constitute a recovery request that involves restoring backed up data to one or more targets.

As the transaction requests are received 506, a determination can be made 508 whether a particular transaction request is a read or write request. If the request is a read request, the data implicated by the read request is recovered 510. Recovery of the data at 510 involves examining the transaction logging records in the NVRAM to determine the types of logging records involved. In the example of FIG. 3, if the logging record is of a Type 1, the method proceeds to 512 where the data associated with the logging record is recovered directly from the NVRAM. In some example embodiments, the Type 1 logging record is a physical logging record concerning a process in which the data of a transaction has been written directly to the NVRAM. Thus, the Type 1 logging record may consist of a single (key, value) pair or, alternatively, may comprise a relatively small number of (key, value) pairs, such as five or fewer (key, value) pairs.

If, on the other hand, the logging record is determined 512 to be a Type 2 logging record, the method proceeds to 514 where logical data of the logging record is used to recover the underlying data. As such, the Type 2 logging record can be a logical logging record concerning a process in which logical data concerning a transaction has been written to the NVRAM. Thus, in some embodiments, the Type 2 logging record may simply include an operation type, such as 'write' for example, and a file name of the file that was written to storage, that is, storage other than the NVRAM. Where the logging record is a Type 2 logging record, the associated data may be recovered by translating the logical data of that logging record and then performing the requested recovery operation. Processes 510 through 512/514 can be performed repeatedly until one, some, or all of the logging records in the NVRAM have been examined.

In either case, that is, whether a logging record is identified as Type 1, such as a physical logging record, or Type 2, such as a logical logging record, the data associated with the logging record is then transmitted 516, such as to a backup server for example. In at least some embodiments, the recovered data is not transmitted 516 to the backup server until all of the logging records in NVRAM concerning the requested read transaction have been examined and the associated data recovered. In other embodiments, data associated with a logging record can be transmitted 516 to the backup server as soon as that data is recovered, rather than being delayed until some or all of the logging records to be examined. In any case, the backup server may cooperate with a backup client to restore 518 the recovered data to one or more targets. As noted elsewhere herein, the recovered that that is restored 518 may be deduplicated data, although that is not required.

With continued reference to FIG. 3, if it is determined at 508 that the transaction request is a write request, the method proceeds to 520 where a determination is made as to what type of logging, for example, Type 1 or Type 2, should be performed in connection with the write request. As noted herein, this determination 520 can be based on a variety of factors including the number of (key, value) pairs involved in the transaction, the amount of NVRAM space available, and/or other considerations disclosed herein.

In the illustrated example, where a determination is made 520 that a Type 1 logging record will be created, the method 500 proceeds to 522 where a physical logging record is created. A physical logging record can be created when, for example, a very small transaction, such as a transaction that consists of a single (key, value) pair is involved. Thus, the physical logging record may consist of that single (key, value) pair. On the other hand, where a determination is made 520 that a Type 1 logging record will be created, the method 500 proceeds to 524 where a logical logging record is created. A logical logging record can be created when, for example, a transaction that involves a relatively large number of (key, value) pairs, such as a file creation transaction for example, is specified by the write request.

In at least some embodiments, the determination 520 may involve a comparison, such as exemplified in Table 1, of the relative amount of NVRAM respectively implicated by a physical logging process and a logical logging process. That is, such a determination may involve first calculating an NVRAM requirement for physical logging of the requested transaction, then calculating an NVRAM requirement for logical logging of that requested transaction, and then creating either a physical logging record or logical logging record, based on whichever logging record involves the least amount of NVRAM.

In any event, once the logging record, or records, are created 522/524, the logging record is written 526 to the NVRAM. Thus, the NVRAM can include a mix of at least two different types of logging records. As explained above, one type of logging record in the NVRAM can be a physical logging record, and the other type of logging record in the NVRAM can be a logical logging record. When the logging records are no longer needed, the NVRAM can be flushed 528.

As will be apparent from the disclosure herein, multiple different logging processes can be performed, and associated logging records created, in connection with a single grouping of data. For example, a logical logging record can be created in connection with the creation of a file, while one or more physical logging records can be created in connection with updates to that file. Correspondingly, multiple different logging records may be created in connection with the performance of a single file process, such as a renaming process for example (see Table 2). As shown in Table 2, the renaming of a file may employ a hybrid logging process that involves the creation of one or more physical logging records as well as the creation of one or more logical logging records. As also shown in Table 2, the renaming process, for example, can be performed, though less efficiently in terms of NVRAM usage, using only a physical logging process.

In general, the particular mix of physical and logical logging processes with respect to any given dataset can be determined based on a variety of parameters as disclosed herein. One, some, or all, of such parameters can be user-specified, such as by way of a graphical user interface (GUI) or other interface, at a client machine, backup server, deduplication storage server and/or elsewhere. As well, one, some or all of such parameters can be predetermined.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system, comprising:
one or more hardware processors; and
a computer readable storage medium storing instructions that are executable by the one or more hardware processors to perform operations comprising:
determining an amount of non-volatile random access memory (NVRAM) needed for a set of one or more write requests, and allocating the amount of NVRAM to the set of one or more write requests;
receiving a write request;
performing a first type of logging process in connection with the write request, and creating a corresponding first logging record;
performing a second type of logging process in connection with the write request, and creating a corresponding second logging record, wherein the second type of logging process is different from the first type of logging process;
determining, as between the first logging record and the second logging record, which of those two logging records requires the least amount of non-volatile random access memory (NVRAM); and
writing, to the NVRAM, the logging record that requires the least amount of NVRAM.

2. The system as recited in claim 1, wherein one of the logging processes is a physical logging process.

3. The system as recited in claim 1, wherein one of the logging processes is a logical logging process.

4. The system as recited in claim 1, wherein the first type of logging process is a physical logging process, and the second type of logging process is a logical logging process.

5. The system as recited in claim 1, wherein the first logging record comprises a (key, value) pair.

6. The system as recited in claim 1, wherein the second logging record comprises a (operation type, metadata) pair.

7. The system as recited in claim 1, wherein the logging record written to NVRAM is either a physical logging record or a logical logging record.

8. The system as recited in claim 1, wherein the operations further comprise determining a first threshold NVRAM space requirement that corresponds to the first type of logging process, and determining a second threshold NVRAM space requirement that corresponds to the second type of logging process.

9. The system as recited in claim 8, wherein the first threshold NVRAM space requirement and the second threshold NVRAM space requirement each respectively comprise a threshold at which one of the first type of logging process and the second type of logging process is preferred over the other of the first type of logging process and the second type of logging process.

10. The system as recited in claim 1, wherein the NVRAM is allocated on a namespace basis.

11. A system, comprising:
one or more hardware processors; and
a computer readable storage medium storing instructions that are executable by the one or more hardware processors to perform operations comprising:
determining an amount of non-volatile random access memory (NVRAM) needed for a set of one or more write requests, and allocating the amount of NVRAM to the set of one or more write requests;
writing data by performing the following:
receiving a write request;
performing a first type of logging process in connection with the write request, and creating a corresponding first logging record;
performing a second type of logging process in connection with the write request, and creating a corresponding second logging record, wherein the second type of logging process is different from the first type of logging process;
determining, as between the first logging record and the second logging record, which of those two logging records requires the least amount of non-volatile random access memory (NVRAM);

creating a stored logging record by writing, to NVRAM, the logging record that requires the least amount of NVRAM; and reading data by performing the following:

receiving a read request;

accessing, in response to the read request, the stored logging record; and recovering data associated with the stored logging record.

12. The system as recited in claim 11, wherein recovering data associated with the stored logging record comprises either recovering data included in the stored logging record, or recovering data based on logical data included in the stored logging record.

13. The system as recited in claim 11, wherein the first type of logging record is a physical logging record, and the second type of logging record is a logical logging record.

14. The system as recited in claim 11, wherein the NVRAM is allocated on a namespace basis.

* * * * *